United States Patent [19]

Crist et al.

[11] 4,269,075
[45] May 26, 1981

[54] COUPLING ARRANGEMENT FOR DETACHABLY CONNECTING A DRIVEN UNIT TO A DRIVE UNIT

[76] Inventors: Gerald L. Crist, 6468 Hahn Rd., Bradford, Ohio 45308; Arlen E. Flora, 4379 Childrens Home Rd., Greenville, Ohio 45331

[21] Appl. No.: 30,233

[22] Filed: Apr. 16, 1979

[51] Int. Cl.³ ............................................. F16H 57/02
[52] U.S. Cl. ..................................... 74/16; 74/421 A; 74/606 R; 285/305; 339/126 R; 403/316
[58] Field of Search .................. 74/16, 421 A, 606 R; 285/84, 85, 305; 292/256.6, 302; 339/75 R, 75 M, 75 P, 126 R, 184 R, 184 M, 186 R, 186 M; 403/315, 316, 317

[56] References Cited

U.S. PATENT DOCUMENTS

| 221,153 | 11/1879 | Chapin | 285/305 |
|---|---|---|---|
| 2,728,236 | 12/1955 | Hemmeter | 74/16 |
| 2,917,929 | 12/1959 | Sprague | 74/16 |
| 3,002,175 | 9/1961 | Bertram et al. | 339/184 M X |
| 3,490,795 | 1/1970 | Hennlich | 285/305 |
| 3,538,940 | 11/1970 | Graham | 285/305 X |

FOREIGN PATENT DOCUMENTS

| 564527 | 10/1944 | United Kingdom | 285/305 |
|---|---|---|---|
| 589491 | 6/1947 | United Kingdom | 74/16 |

*Primary Examiner*—Lawrence J. Staab
*Attorney, Agent, or Firm*—Becker & Becker, Inc.

[57] ABSTRACT

A coupling arrangement for detachably connecting a driven unit to a drive unit, which is connected to the housing of a power source. Mounted to the housing is a frame, having any desired shape, being open toward the center, and comprising two flat pieces which are connected to one another along their outer peripheral edges. The inwardly directed portions of the pieces are spaced from one another to form a slot. A locking slide open toward the center and having no bottom side is insertable in the slot. The sides of the slide and the inwardly directed portions of the frame have grooves which are uniformly dimensioned and symmetrically distributed essentially identically to each other. In at least one not fully inserted position of the slide, its grooves are aligned with corresponding grooves of the frame pieces. A drive gear is rotatably mounted to said housing in the vicinity of the open center of the frame and is operatively connected to the power source. An adaptor, the outer dimension of which conforms essentially to the inner dimension of the frame pieces, is provided with outwardly directed projections or tangs which can be received in the grooves of the frame piece closest to the power source housing. A driven gear, which is operatively connectable to the tool, is rotatably mounted to and within the adaptor is shaped in such a way that it operatively engages the drive gear when the tangs are received in the grooves.

5 Claims, 7 Drawing Figures

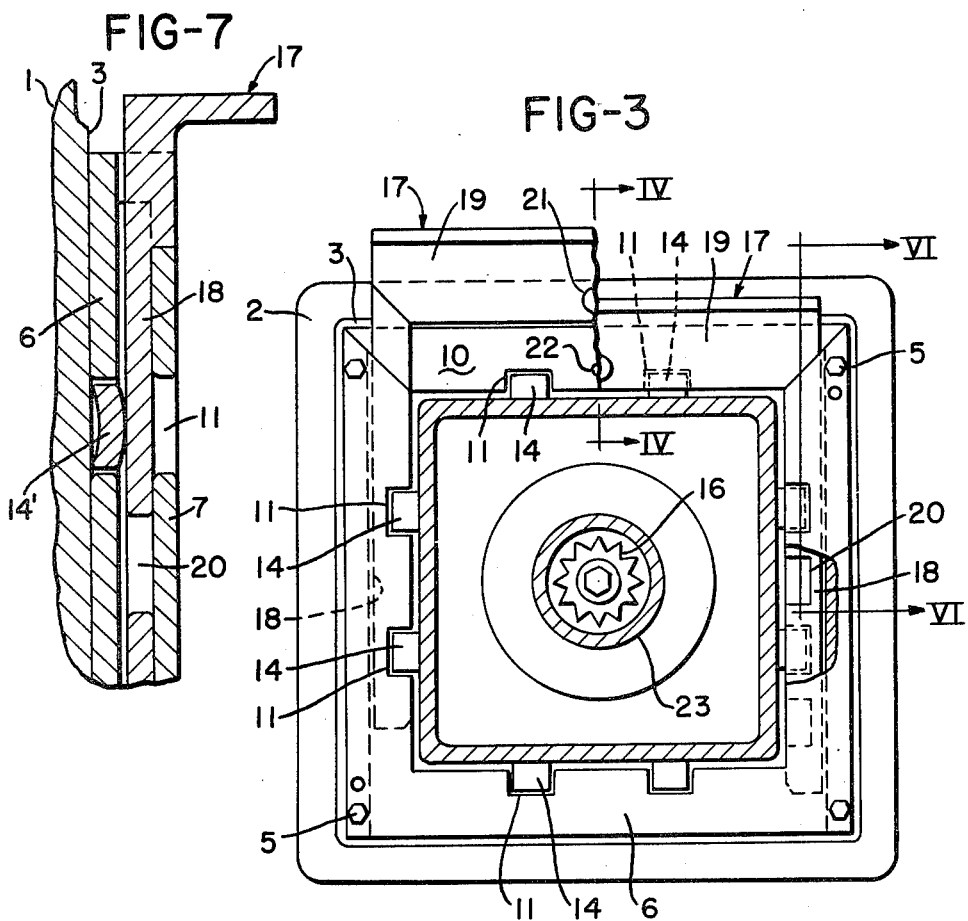
FIG-7
FIG-3
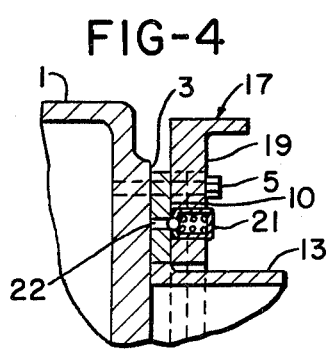
FIG-4
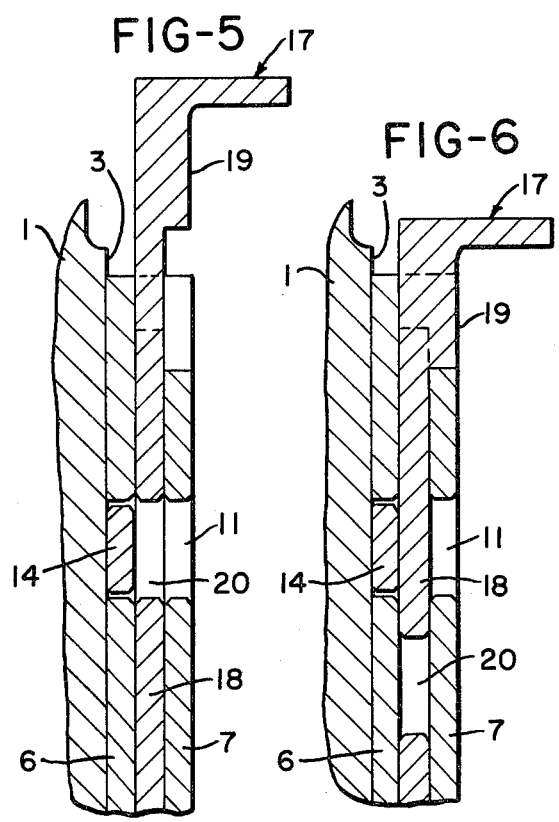
FIG-5
FIG-6

COUPLING ARRANGEMENT FOR DETACHABLY CONNECTING A DRIVEN UNIT TO A DRIVE UNIT

The present invention relates to a coupling arrangement for detachably connecting a driven unit, to which a tool is operatively connectable, to a drive unit, which is connected to the housing of a power source.

In the past, each power driven tool or piece of equipment had to be a self-contained unit, i.e., the drive unit and the driven unit were made as a single piece of equipment. Thus each power driven unit had its own power source (motor, engine) which could drive only the one tool to which it was permanently attached. If many such tools were needed, it became a rather expensive proposition to obtain them. In addition, a large amount of storage area was needed to store the equipment, which was difficult to transport if more than a few pieces of equipment were required to do a job.

It is therefore an object of the present invention to provide a coupling arrangement whereby a driven unit, to which any variety of tools can be operatively connected, is detachably connectable in a simple manner to a drive unit, so that only one drive unit or power source is required for operating a great variety of power driven tools and apparatus.

This object, and other objects and advantages of the present invention, will appear more clearly from the following specification in connection with the accompanying drawings, in which:

FIG. 3 is a view taken along the line III—III of FIG. 2, with the left side showing the drive unit and driven unit assembled but not locked in place, and the right side showing the drive unit and driven unit assembled and locked into place;

FIG. 4 is a view taken along the line IV—IV of FIG. 3 showing in more detail the locking device for holding the slide in a locked position;

FIG. 5 is a partial section showing the drive unit and driven unit assembled and in an unlocked position;

FIG. 6 is a partial section showing the drive unit and the driven unit assembled and in a locked position; and FIG. 7 is a partial section showing a modification of the tangs of the adaptor.

Figure 1:
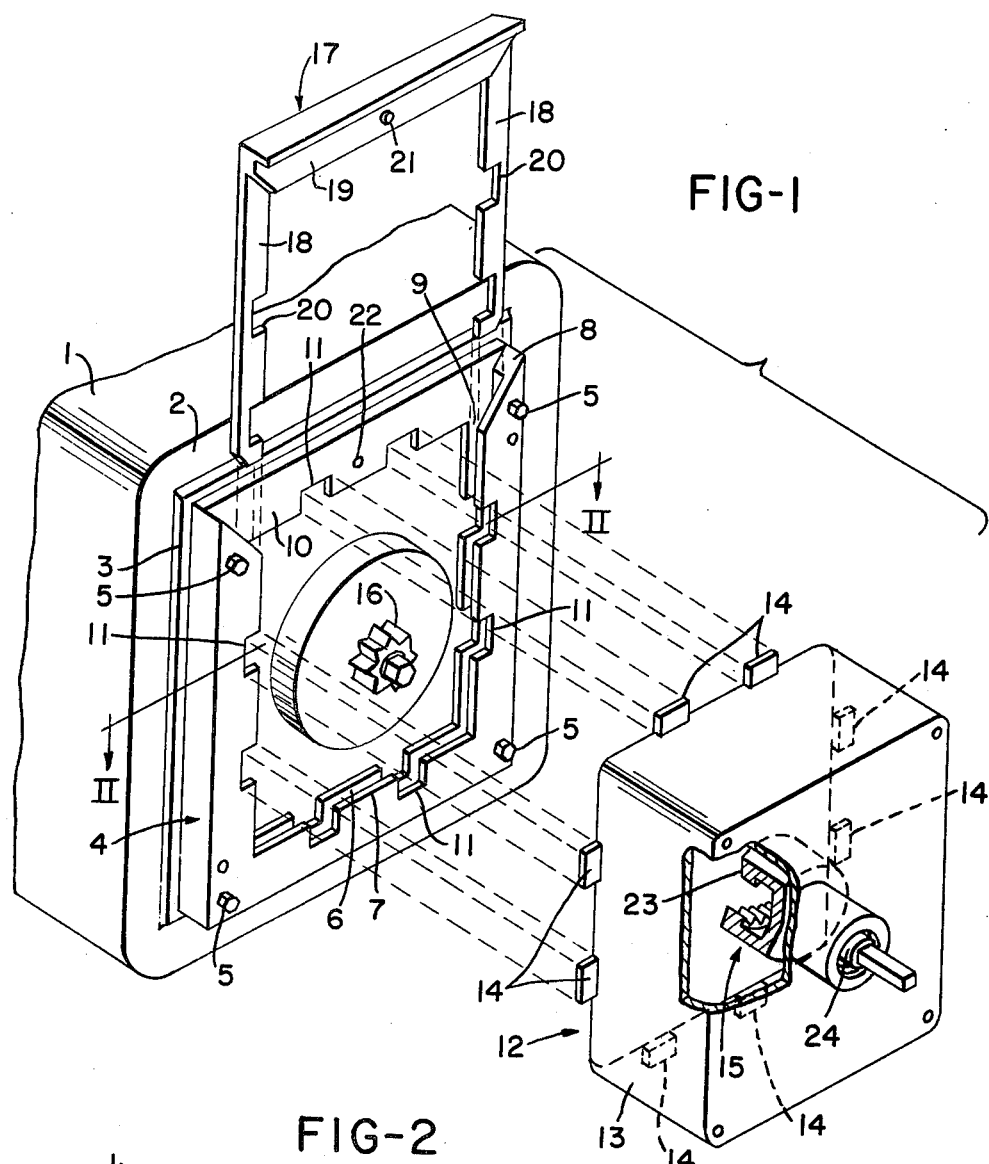
FIG. 1 is an exploded view of the driven unit (adaptor) and the drive unit (frame and locking slide)

The coupling arrangement of the present invention is characterized primarily by a frame which is part of the drive unit, is open in the center, and is mounted to the power source housing. The frame can have any desired shape and includes a first part which is mounted to said housing and is continuous. The frame also includes a second part which is interrupted, and is joined to the first part along the outer peripheral edges of both parts. The inwardly directed portions of the frame parts are spaced from one another to form a slot. The interrupted portion of the second part forms an opening into the slot. Each of the inwardly directed portions of the frame parts are provided with at least two essentially identically dimensioned grooves, with the corresponding grooves of the first and second parts being aligned with one another. The grooves are uniformly and symmetrically distributed in the frame parts. The width of the grooves is less than the distance between two adjacent grooves.

A locking slide, which is interrupted and the outer peripheral edges of which are shaped in conformity with the slot, is adapted to be received in the slot in such a way that the interrupted portion of the slot is diametrically opposite to the interrupted portion of the second part. When the slide is in a fully inserted position, the inwardly directed portions of the slide extend inwardly to the same extent as do the inwardly directed portions of the frame parts, and are received by the slot. They are also provided with grooves dimensioned and distributed essentially identical to the grooves of the frame parts. The slide has at least one not fully inserted position whereby the slide grooves are aligned with the corresponding aligned grooves of the first and second parts. The slide is also provided with a means for retaining the slide in its fully inserted position.

A drive gear is rotatably mounted to the frame housing and is located in the vicinity of the open center of the frame and is operatively connected to the power source.

The coupling arrangement is furher characterized by an adaptor, which forms part of a driven unit. The adaptor includes a housing, the outer dimensions of which conforms essentially to the inner dimensions of the frame parts. The outer periphery of the housing is provided with outwardly directed projections in the form of tangs, which correspond in number, dimension, and symmetrical distribution to the grooves of the first part, so that the tangs can be received in the grooves of the first part.

A driven gear is rotatably mounted to and within the adaptor housing and is operatively connected to a tool. The driven gear is shaped in such a way that it operatively engages the drive gear when the tangs are received in the grooves of the first part.

Since the grooves and tangs are symmetrically distributed on the frame, slide and adaptor respectively, the adaptor, to which a tool or piece of equipment is operably attachable, need not be held in only one specific position for attachment to the frame; that is to say, the adaptor may be turned 0° to 360° from its original position of having the tangs and grooves aligned for insertion of the adaptor into the frame, and yet can still be inserted because the symmetrically arranged tangs and grooves can be aligned at different points of rotation. This makes assembly of the driven unit and drive unit extremely easy and cuts down the time required for assembly.

The present invention offers the distinct advantage that a single power source can operate a great variety of tools, such as lawn and garden tools (aerators, trimmers, sprayers, etc.), commercial apparatus (pumps, saws, compactors, etc.), mechanical equipment (generators, welders, compressors, etc.), recreational apparatus (powered motor boats, all terrain vehicles, etc.), and agricultural equipment (conveyors, augers, fans, soil boring devices, etc). Being able to use a single power source to operate a great variety of tools and equipment greatly reduces the expense involved in obtaining a large inventory of tools and equipment. It also requires less storage space to house the equipment, and greatly simplifies the transportation problem. Again, this is due to the fact that one power source, such as a motor or engine, can operate a large number of tools rather than, as before, each tool requiring its own integrally connected power source.

Referring now to the drawings, FIG. 1 shows the housing 1 of a power unit. The face 2 of the housing 1 is provided with a bossing 3, to which a frame 4 is attached, for example by means of bolts 5. Three of the sides of the frame 4 are formed by parallel pieces 6 and 7 which are formed or joined together along their outer edges as shown at 8. The inwardly directed portions of the parallel pieces 6 and 7 are spaced from one another so as to form a slot 9. The fourth side of the frame 4 (shown as the top side of the frame in FIG. 1) is a single piece 10 which is adjacent to the bossing 3 and has the same thickness as the piece 6, of which it is a continuation. Each of the pieces 6, 7, 10, on each of their sides, is provided with two or more grooves 11. On any given side, the corresponding grooves 11 in the pieces 6, 7 are aligned with one another. The grooves 11 are distributed around the frame 4 so as to form a symmetrical pattern. The width of a given groove 11 is less than the distance between two adjacent grooves and less than the distance between a groove and the end of the pertaining side.

FIG. 1 further shows an adaptor 12, which serves to connect a driven unit or tool to the power unit. The adaptor 12 comprises a housing 13, and the tangs or flanges 14, which are located on the outer periphery of the housing 13. The outer dimension of the adaptor 12 corresponds essentially to the inner dimension of the frame 4. The tangs 14 correspond in size, shape, number, spacing and distribution to the grooves 11 so that the adaptor 12 can be inserted into the frame 4. In particular, the tangs fit into corresponding grooves 11 with little or no play. There is also little or no play between the outer surface of the housing 13 and the inner edges of 6, 7, and 10.

When the adaptor 12 is inserted into the frame 4, a driven mechanism 15 engages a driving gear 16, which is mounted in the housing 1 and is operatively connected to a power unit. After the adaptor 12 has been inserted into the frame 4, it is locked into place by means of a slide or lock gate 17, which fits into the slot 9. The slide 17 has two parallel sides 18 and a connecting piece 19. Each of the sides 18 contains two or more grooves 20 which correspond in size to grooves 11. Adjacent grooves 20 on the sides 18 are spaced from one another by the same amount as are adjacent grooves 11 in the pieces 6, 7 and tangs 14 on the adaptor 12. The grooves 20 are spaced from the ends of the sides 18 in such a way that when the slide 17 is inserted all the way into the slot 9, those portions of the sides 18 between adjacent grooves 20 not only cover the tangs 14 in the grooves 11 of the piece 6 but, since the distance between two adjacent grooves 20 is greater than the width of a groove 20 (and therefore the width of the tangs 14 and the grooves 11), overlap those portions of the piece 6 adjacent the grooves 11. At the same time, the connecting piece 19 covers the entire length of the piece 10 along with the grooves 11 thereof and the tangs 14 in these grooves 11. This holds the adaptor 12 securely in the frame 4. To prevent the slide 17 from slipping, a locking device 21, which engages a bore or recess 22 in the piece 10, is provided. This slide 17 may be completely removable from the slot 9 in the frame 4 or it may be provided with a standard type of catch to stop its outward movement at some desired point.

Figure 2:
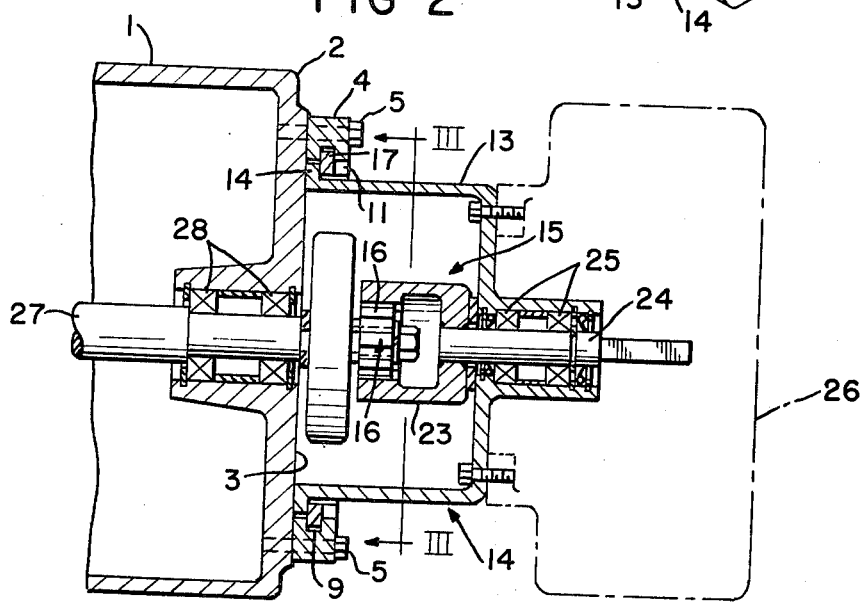
FIG. 2 is a view taken along the line II—II of FIG. 1 showing the drive unit and driven unit assembled and locked into place.

The driven mechanism 15, which is shown in greater detail in FIG. 2, comprises a female or internal driven gear 23 and a driven shaft 24. The driven mechanism 15 is rotatably mounted in the housing 13, for example by means of a bearing arrangement 25. A power driven tool 26 (shown schematically) is positively connected to the driven shaft 24. The driven tool housing may be bolted or welded to, or of one-piece construction with, the adaptor housing 13. The driven tool 26 may be directly connected to the driven shaft 24 or indirectly connected by means of a transmission system. As described above, when the adaptor 12 is coupled with the frame 4, the internal driven gear 23 meshes with the driving gear 16. The driving gear 16 is connected to a drive shaft 27 of an engine or motor, the drive shaft 27 being rotatably journalled in the housing, for example by means of bearings 28. The driving gear 16 and the internal driven gear 23 may have any shape as long as they correspond to each other.

The left part of FIG. 3 shows the position of the adaptor 12 immediately upon its insertion into the frame 4, with the slide 17 in an unlocked or up position (see also FIG. 5). In this position, the grooves 11 of the pieces 6 and 7 and the grooves 20 of the slide 17 are aligned. This makes it possible to insert and remove the adaptor 12 into and out of the frame 4, since it allows the tangs 14 to easily slip into or out of position within the grooves 11 of the pieces 6 and 10.

The right part of FIG. 3 shows the position of the adaptor 12 after it has been inserted into the frame 4 and the slide 17 has been pushed into its down or locked position. The cut-away shows how the tangs 14 fit into the grooves 11 of the piece 6. At the same time, they are covered by those portions of the sides 18 located between adjacent grooves 20 thereof and between the ends of sides 18 and an adjacent groove 20 (see also FIG. 6). In addition, the tangs 14 positioned in the grooves 11 of the piece 10 are covered by the connecting piece 19 of the slide 17. This enables the adaptor 12 to be held firmly in place in the frame 4 during operation of the driven tool. To prevent the slide 17 from accidently slipping out of its locked position, a locking device 21 is provided. As shown in FIG. 4, this locking device comprises a ball detent arrangement, which is located in the slide 17, with the ball engaging the bore or recess 22 during the locked position. Naturally, any other standard locking device can be used in place of the ball detent arrangement.

The slide 17 may be provided with a handle-like portion to make it easy to move the slide into and out of its locked position in the slot 9. The slide 17 may be removed entirely from the slot 9, or may be limited in its movement within the slot 9 by customary means. In the latter instance, for ease of insertion and removal of the tangs 14 from the grooves 11 of the pieces 6 and 10, the upper unlocked, or maximally extended position of the slide 17 may be fixed to provide the positioning shown in FIG. 5. In this position, the grooves 11 and 20 of the pieces 6, 7, and 18 respectively are all aligned. In the down or locked position of the slide 17, as shown in the right side of FIG. 3 and in FIG. 6, the tangs 14 are held in the grooves 11 of the pieces 6 and 10 by means of the sides 18 and the connecting piece 19 of the slide 17.

Although normally the clearances between the slide 17 and the frame 4 are small enough that the exertion of at least a slight pressure is necessary to move the slide in the slot 9, in those instances where stronger vibrations are encountered, or merely as a safety measure, the tangs 14' shown in FIG. 7 may be provided with a bulge which faces the slide 17 and extends into the slot 9 beyond the surface of the piece 6. This provides a tighter fit of the slide 17 in the slot 9. As an alternative, or in addition to the bulged tank 14', the sides 18 of the slide 17 may also be provided with bulged sections. These bulged sections would also allow for a tighter fit, as well as helping to retain the slide 17 in its unlocked upright position so that two hands could be used to assemble or disassemble the coupling device. The slide 17 could also be held in its upright unlocked position by using pins or some other device to prevent it from slipping down.

The specific construction of the frame 4, the slide 17, the adaptor 12, and the other portions of the coupling device of the present invention may vary. For instance, the frame 4 can be made of one piece which has been milled out, or can comprise two or more pieces which have been welded, bolted, or otherwise joined together to provide the slot 9. Similarly, the connecting piece 19 of the slide 17, and the piece 7, may have correspondingly shaped seating surfaces for seating of the side 17 on the frame 4. These seating surfaces may have any desired shape, such as angled (as shown in the drawings), rounded, flat, etc. The shapes of the grooves 11 and 20, and of the tangs 14, need not necessarily be square or rectangular, but could be rounded, triangular, etc., as long as the shapes of the grooves and the tangs correspond to each other and continue to fit together as described above. The shape of the frame 4, the slide 17, and the adaptor 12 can likewise vary as long as the symmetry of the grooves is maintained.

The material used in construction of the coupling device of the present invention may be of any desired type, e.g. some type of metal or plastic or wood could be used for the housing 1, frame 4, slide 17, and adaptor 12, or one or more parts could be constructed of metal while the remaining parts are constructed of plastic and/or wood.

Any desired type of power source, e.g. electrical, gas powered, etc., may be used. In addition, the size and horsepower of the power source may vary. Although the drawings show a centrifugal clutch, this may or may not be present, depending upon whether it is necessary to power the desired driven tool. Also, conduits for electrical connections, cooling fluid, hydraulic fluid, etc., may be added, if so desired. Any standard connector may be used for this purpose.

One or more locating dowels may also be added to aid in lining up the frame 4 and housing 1 prior to the attachment of frame 4 to the housing 1, thereby speeding up the time required for assembly of the drive unit.

The present invention is, of course, in no way limited to the specific disclosure of the specification and drawings, but also encompasses any modifications within the scope of the appended claims.

What is claimed is:

1. A coupling arrangement for detachably connecting a driven unit, to which a tool is operatively connectable, to a drive unit, which is connected to the housing of a power source, said coupling arrangement comprising:

a frame which forms part of said drive unit, is open toward the center, is mounted to said housing, and has any desired shape, said frame including a first part which is continuous and is mounted directly to said housing, and a second part which has an open portion and is connected to said first part along at least part of the outer peripheral edges of both of said frame parts, said frame parts having inwardly directed portions spaced from one another to form a slot, said open portion of said second part forming an opening into said slot, each of said inwardly directed portions of said frame parts being provided with at least two essentially identically dimensioned grooves, corresponding grooves of said first and second frame parts being aligned with one another, said grooves being uniformly and symmetrically distributed in said frame parts, the width of a given groove on said first and second frame parts being less than the distance between two adjacent grooves;

a locking slide which has an open interrupted portion, is open toward the center, and has outer peripheral edges, those outer peripheral edges of said slide adjacent said open interrupted portion being shaped in conformity with the dimensions of said slot, so that said slide is adapted to be displaceably received, through said open portion of said second frame part, in said slot in such a way that when said slide is located in said slot, said open interrupted portion of said slide is diametrically opposite said open portion of said second frame part, said slide having inwardly directed portions which extend inwardly, in the fully inserted state of said slide, to the same extent as do said inwardly directed portions of said frame parts, those inwardly directed portions of said slide adjacent said open interrupted portion being provided with grooves dimensioned and distributed essentially identical to said grooves of said frame parts, said slide having at least one not fully inserted state in said slot whereby said slide grooves are aligned with corresponding aligned grooves of said first and second frame parts;

means for retaining said slide and its fully inserted state in said slot;

a drive gear rotatably mounted to said housing in the vicinity of said open portion of said frame, said drive gear being operatively connected to said power source;

an adaptor forming part of said driven unit and including a housing, said housing having an outer dimension which conforms essentially to that part of said frame which is open to the center, said adaptor housing having an outer periphery provided with outwardly directed projections in the form of tangs, said tangs corresponding essentially in dimension, number, and symmetrical distribution to said grooves of said first frame part, so that said tangs are adapted to be received in said grooves of said first frame part; and a driven gear rotatably mounted to and within said adaptor housing and operatively connectable to said tool, said driven gear being mounted and shaped in such a way that it operatively engages said drive gear when said tangs are received in said grooves of said first frame part.

2. A coupling arrangement according to claim 1, in which said first frame part and said adaptor housing are essentially square, and said second frame part and said slide respectively comprise three sides in the shape of a U with adjacent sides of each being substantially perpendicular to one another, said second frame part and said slide each having at least two grooved sides which have two grooves, and each side of said adaptor housing having two tangs.

3. A coupling arrangement according to claim 1, in which said means for retaining said slide includes a recess in said first frame part and a ball detent device in said slide, the ball of said detent device being adapted to engage said recess when said slide is in its fully inserted state in said slot.

4. A coupling arrangement according to claim 1, in which said means for retaining said slide includes at least some tangs which are bulged in such a way that when said tangs are received in said grooves of said first part, and said slide is in its fully inserted state in said slot, said bulged tangs engage said slide.

5. A coupling arrangement according to claim 1, in which the dimensions of said slot and said slide nearly correspond, so that when said slide is in its fully inserted state in said slot, said slide nearly engages the pertaining portions of said inwardly directed portions of said first and second frame parts.

* * * * *